June 26, 1928.
E. TIMBS
1,675,068
WIRE LINE LUBRICATOR
Filed March 29, 1927
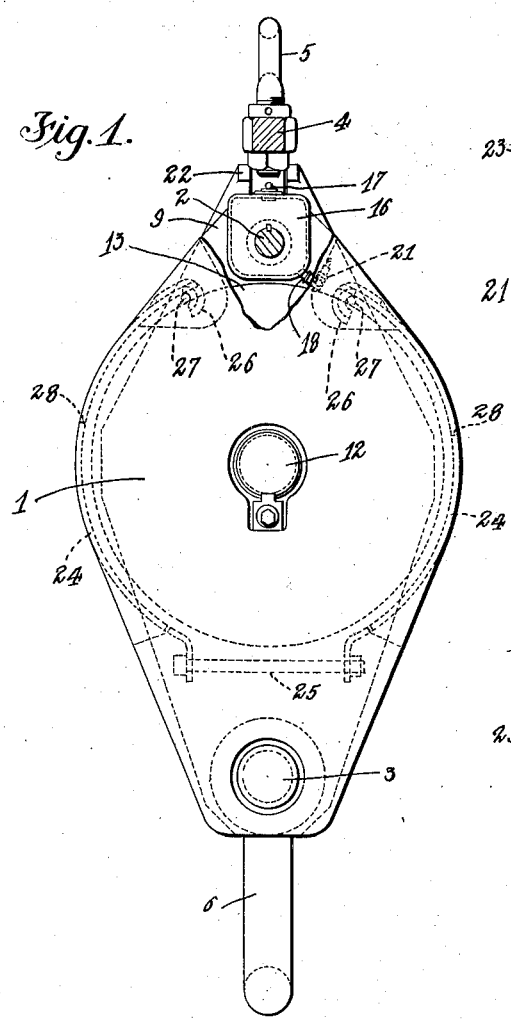
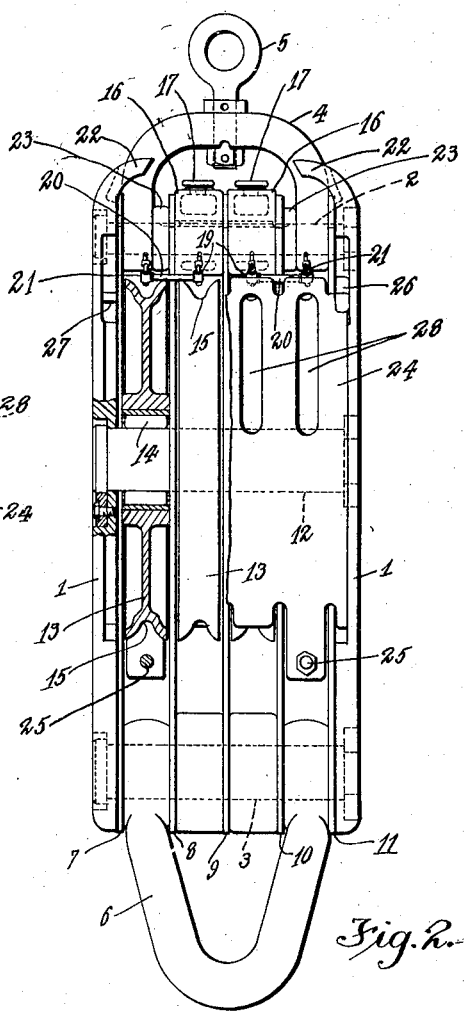
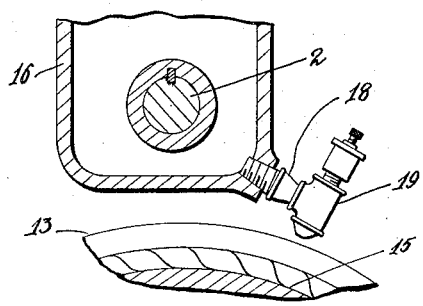
Inventor
Edward Timbs
By Lyon & Lyon
Attorneys Patented June 26, 1928.

1,675,068

UNITED STATES PATENT OFFICE.

EDWARD TIMBS, OF LOS ANGELES, CALIFORNIA, ASSIGNOR TO THE NATIONAL SUPPLY COMPANY OF DELAWARE, OF NEW YORK, N. Y., A CORPORATION OF DELAWARE.

WIRE-LINE LUBRICATOR.

Application filed March 29, 1927. Serial No. 179,216.

This invention relates to wire line lubricators, and is more particularly directed to a wire line lubricator adapted for use in connection with a traveling block such as is used for the purpose of hoisting drill pipes, casing, and the like in the drilling, maintaining and repairing of oil wells or the like.

Wire lines are customarily employed in the hoisting and lowering of drill pipe casings and the like in the drilling, maintaining or constructing of oil wells, and this wire line is wound upon the drum of a rotary drawworks or the like and passes over the crown block of the rig and is wound around the sheaves of a traveling block. The wire line is subjected to a load of many tons, and is caused to travel rapidly around the sheaves of the traveling block so as to produce considerable frictional contact between the separate strands of the wire line or cable. In order to preserve the life of the cable and prevent the frictional contacting or rubbing of the strands of the cable together from wearing out the wire line or cable, it is necessary that the same be lubricated. It is therefore an object of this invention to produce means for lubricating the wire line as the same is traveling over the sheaves of a traveling block, so as to increase the life of the wire line or cable.

Another object of this invention is to provide lubricant reservoirs which are mounted permanently in position in a traveling block and are provided with drip cocks which drip lubricant from the reservoirs onto the periphery of the sheaves over which the wire line or cable is trained.

Other objects and advantages of this invention it is believed will be apparent from the following detailed description of a preferred embodiment thereof, as illustrated in the accompanying drawings.

In the drawings:

Figure 1 is a side elevation of a traveling block illustrating a wire line lubricator embodying this invention as positioned therein, and illustrating a portion of the traveling block as broken away to show the wire line lubricator in full lines.

Figure 2 is a front elevation of a traveling block illustrating wire line lubricators embodying this invention as mounted thereon.

Figure 3 is an enlarged fragmental view of a wire line lubricator embodying this invention.

In the preferred embodiment of this invention illustrated in the accompanying drawings is shown a traveling block, which may be of any suitable or desirable construction, and which is herein illustrated as comprising side plates 1, which are secured together at their opposite ends by means of shackle bolts 2 and 3. Journaled on the upper shackle bolt 2 is a shackle 4, in the upper end of which is secured an eye-bolt 5. The eye-bolt 5 is secured to the free end of the wire line. Journaled on the lower shackle bolt 3 is a shackle or yoke 6, which is secured to any suitable form of hook or connecting means (not shown). Secured between the shackle bolts 2 and 3 are spacing plates 7, 8, 9, 10 and 11, which divide the traveling block 1 into a plurality of independent sheave containing compartments.

The traveling block herein illustrated is shown as being formed with four independent sheaves. However, this invention is not dependent upon the construction of the traveling block, the number of sheaves contained therein, or the like. A shaft 12 is passed through the side plates 1 and through each of the dividing plates 7, 8, 9, 10 and 11, and upon the shaft 12 the sheaves 13 are journaled on bearings 14. The sheaves 13 are formed with peripheral grooves 15, within which the cable or wire line is trained. Mounted on the upper shackle bolt 2, preferably within the shackle 4, are lubricant reservoirs 16 which may be of any suitable or desirable construction, and are preferably mounted in position so as to prevent their rotation on the shackle bolt 2. The reservoirs 16 are provided with cap openings 17 through which the lubricant is placed to fill the same. At a low point in the level of the reservoirs 16 there are secured conduits 18 which extend laterally outward from the reservoirs 16 and are provided at their advanced ends with drip cocks 19, which may be of any suitable or desirable construction, as is well understood in the art. The drip cocks 19 may be of any suitable form of needle or like valve, which permits a predetermined drip of lubricant to pass therethrough, and the drip cocks 19 are positioned immediately over the peripheral grooves 15 of the sheaves 13, so that the lubricant drip thereby will fall into these peripheral grooves, where the wire line or cable is not trained thereon. The rotation of the sheaves 13 thereafter carries the lubricant into position to be picked up by the wire line as the same passes over the sheaves.

In order to lubricate the outer sheaves 13 of the traveling block, as shown in the accompanying drawings, it may be advisable to connect the conduits 18 with conduits 20, which extend transversely of the block to a position immediately over the outer sheaves 13, where the same are fitted with drip cocks 21, similar to the drip cocks 19. The drip cocks 21 can be positioned immediately over the peripheral grooves 15 of the sheaves 13.

In order to prevent the shackle 4 from causing the shackle bolt 2 to rotate, and thereby rotate the lubricant reservoirs 16, it is preferable that the end plates 1 be formed with inwardly divergent fingers 22 which engage upon the opposite sides of the shackle 4 to prevent the same rotating on or causing the shackle bolt 2 to rotate in the end plates 1. The lubricant reservoirs 16 may be secured to the shackle bolt 2 in any suitable or desirable manner, such, for example, as clamping the same rigidly in position between the retaining plates 8, 9 and 10 by means of collars 23 mounted on the shackle bolt 2.

As is now customarily provided in traveling blocks of the type herein illustrated, there is shown in the drawings guards 24 which may be formed of curved portions of sheet metal, which are clamped in position at their lower ends by means of bolts 25, and at their upper ends provided with hook sections 26 which extend over cross bars 27 mounted between the side plates 1 of the traveling block. The guards 24 are provided with longitudinally extending slots 28 through which the wire line or cable is extended. The guards 24 serve the further purpose of preventing the lubricant which is fed into the peripheral grooves 15 of the sheaves 13 from being spattered outward from the traveling block 1.

Having fully described my invention, it is to be understood that I do not wish to be limited to the details herein set forth, which may obviously be varied without departing from the spirit of my invention as will be apparent from the appended claims.

I claim:—

1. In a traveling block, the combination of a frame structure, a shaft supported by the frame structure, a plurality of sheaves mounted on the shaft, each of said sheaves having a peripheral groove formed therein, a pin at the upper end of the frame structure, a plurality of independent lubricant reservoirs mounted on the pin, and drip means operatively connected with each of the reservoirs in position immediately over the peripheral groove of each sheave.

2. In a device of the class described, the combination of a frame structure, a shaft supported by the frame structure, a sheave mounted on the shaft, said sheave having a peripheral groove formed therein, a pin at the upper end of the frame structure, a lubricant reservoir mounted on the pin, and drip means operatively connected with the reservoir in position immediately over the peripheral groove of said sheave.

3. In a device of the class described, the combination of a frame structure, a shaft supported by the frame structure, a plurality of sheaves having peripheral grooves formed therein, a pin mounted at the upper end of the frame structure, lubricant reservoir means mounted on the pin, and drip means operatively connected with the reservoir means in position immediately over the peripheral groove of each said sheave.

4. In a traveling block, the combination of a frame structure, a shaft supported by the frame structure, a plurality of sheaves mounted on the shaft, each of said sheaves having a peripheral groove formed therein, a pin at the upper end of the structure, a shackle journaled on said pin, the shackle being substantially U-shaped, lubricant reservoir means mounted on the pin intermediate the ends of the U-shaped shackle, and drip means operatively connected with the reservoir means in position immediately over the peripheral groove of each sheave.

Signed at Torrance, California, this 22 day of March, 1927.

EDWARD TIMBS.